United States Patent
Aggarwal et al.

(10) Patent No.: US 8,352,909 B2
(45) Date of Patent: Jan. 8, 2013

(54) BUSINESS PROCESS DIAGRAM (BPD) COMPONENT ANALYSIS

(75) Inventors: Anurag Aggarwal, Sunnyvale, CA (US); Vishal Saxena, Fremont, CA (US); Ganesh Radhakrishnan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1127 days.

(21) Appl. No.: 12/287,323

(22) Filed: Oct. 8, 2008

(65) Prior Publication Data

US 2010/0088251 A1 Apr. 8, 2010

(51) Int. Cl.
*G06F 9/44* (2006.01)
(52) U.S. Cl. ............................................ 717/109
(58) Field of Classification Search .................. 717/109
See application file for complete search history.

(56) References Cited

U.S. PATENT DOCUMENTS

| | | | |
|---|---|---|---|
| 7,480,610 B2 * | 1/2009 | Scott et al. | 703/23 |
| 2008/0071595 A1 * | 3/2008 | Chang et al. | 705/7 |
| 2008/0301419 A1 * | 12/2008 | Barros et al. | 712/233 |
| 2010/0031263 A1 * | 2/2010 | Lamothe | 718/102 |
| 2010/0057482 A1 * | 3/2010 | Radhakrishnan et al. | 705/1 |

* cited by examiner

*Primary Examiner* — Chun-Kuan Lee
(74) *Attorney, Agent, or Firm* — Kraguljac Law Group LLC

(57) ABSTRACT

Systems, methods, and other embodiments associated with business process diagram (BPD) component analysis are described. One example method includes accessing a BPD having a BPD component for which a mapping to a business process execution language (BPEL) component is to be automatically produced by a computer. The example method may also include detecting a join gateway in the BPD. The example method may also include manipulating the mapping to identify that resolution of the join gateway is to be determined by gateway resolution upon determining that the join gateway is not going to receive a loop back edge.

19 Claims, 15 Drawing Sheets

US 8,352,909 B2

BUSINESS PROCESS DIAGRAM (BPD) COMPONENT ANALYSIS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Most organizations have some business processes that facilitate their business. Examples of business processes are the process for vacation approval, where an employee requests a vacation and the request goes through an approval process and then is rejected or approved. Another example is some sales process, where some purchase order is received and priced and items shipped and fulfilled, an invoice sent and payment received. These business processes are critical to the functionality of the organization. There exist industry standards to capture these business processes and to draw them. These are generally termed Business Process Diagrams (BPD). Two standards are Business Process Modeling Notation (BPMN) and Business Process Execution language (BPEL).

There are some differences in BPMN and BPEL. One difference is that BPEL has standard programming constructs like if-then-else or while or switch, and falls into the category of block structured languages because there are well defined blocks in the business diagram. BPMN, on the other hand, offers more flexibility and does not always follow block structures, the diagrams are more unstructured and graph like. For example, in BPEL all the branches of a switch would join back together, while in BPMN one of the branches may end in a terminate event. BPMN falls into the category of flow structured languages.

BPEL provides a formal mechanism for the definition of business processes. BPEL is optimized for the operation and/or interoperation of business process modeling (BPD) systems. But BPEL is ill-suited for use by many business analysts. While useful for programming a computer, from the point of view of a business analyst, sets of BPEL statements may appear to organize a complex business process into complex, disjointed, unintuitive formats that are understandable by computers but perhaps not so understandable by business analysts, managers, and so on. These analysts, managers, and so on may be more comfortable with flowcharts associated with BPMN. Thus, BPMN provides a BPD designed for humans and provides a formal mapping to a BPEL.

BPMN is a new standard and many organizations have investments in BPEL engines. Thus, it may be desirable to convert BPMN processes to BPEL processes. The conversion may be desired because a human (e.g., business analyst) may prefer to interact with a BPMN while a computer may be programmed using BPEL. But this is inherently challenging to convert a flow language to block language. If the BPMN process is not very unstructured and is balanced, then existing algorithms that are defined as part of the BPMN standard can help in the conversion to BPEL. A component analysis is done on BPMN processes and structures (e.g., while, switch) are identified and corresponding BPEL structures are generated. This uses a token flow algorithm. Token analysis includes creating and tracking tokens through different execution paths to discover the boundaries of well-structured components.

BRIEF DESCRIPTION OF THE DRAWINGS

The accompanying drawings, which are incorporated in and constitute a part of the invention, illustrate various example systems, methods, and other example embodiments of various aspects of the invention. It will be appreciated that the illustrated element boundaries (e.g., boxes, groups of boxes, or other shapes) in the figures represent one example of the boundary. Elements may not be drawn to scale.

DETAILED DESCRIPTION

Figure 1:
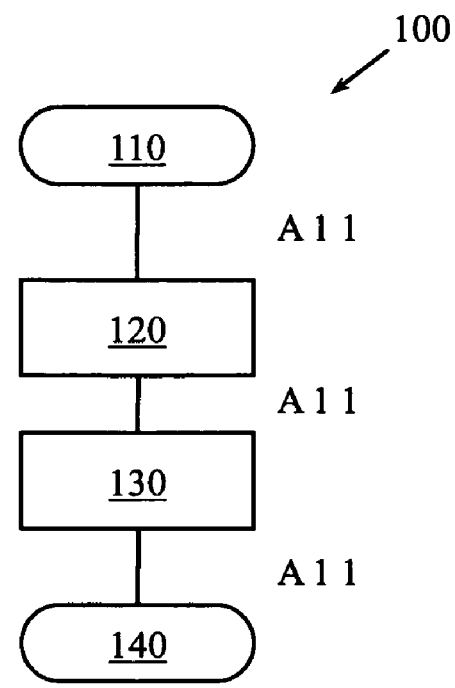
FIG. 1 illustrates an example well-structured component that is annotated with tokens.

Example systems and methods facilitate mapping non-well-structured BPMN components to BPEL components. Example systems and methods may perform a two pass technique to detect and handle a loop component. Example systems and methods may employ a deferred gateway data structure to facilitate waiting for long branches. Example systems and methods may establish and manipulate an "end-tokens" data structure to facilitate handling unbalanced components like one branch of switch ending in terminate process event. Example systems and methods maintain a "fractional end-tokens" data structure to facilitate handling unbalanced components. Example systems and methods may present error messages and or take error handling actions when there are components that can not be converted.

As described in the background section, the BPMN specification includes commentary concerning well balanced BPMN process. However, issues occur with BPMN processes that are not well balanced. There can be unbalanced cases in BPMN that cannot be readily and provably correctly transformed. A business analyst may want to be informed of this conversion issue and of other types of conversion errors. Being aware of these conversion errors facilitates taking a corrective action. Example systems and methods include providing appropriate error messages at the appropriate place in the business process.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing executing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

FIG. 1 illustrates an example well-structured component 100 for which a mapping from a BPMN representation to a set of BPEL instructions may be desired. Component 100 starts processing at start point 110 and proceeds through processes 120 and 130 to conclude at ending point 140. There is no branching in component 100 and thus converting the component 100 from BPMN to BPEL is straight forward. Component 100 is well-structured because it has a known starting location, a known ending location, a continuous path from the start to the end, and no un-resolved branches.

FIG. 1 introduces the concept of a token and step by step token analysis. Thus, at start location 110 a token A may be generated. The token may include information that it is token one of one (e.g., A 1 1) associated with the current path. As the component path proceeds through elements 120 and 130, a token analysis process may determine whether a complete set of tokens is present for the process. If a complete set is available, then the execution may be allowed to flow forward to a next process. At concluding point 140, a token analysis process may again determine whether a complete set of tokens is available before allowing the component 100 to conclude.

Figure 2:
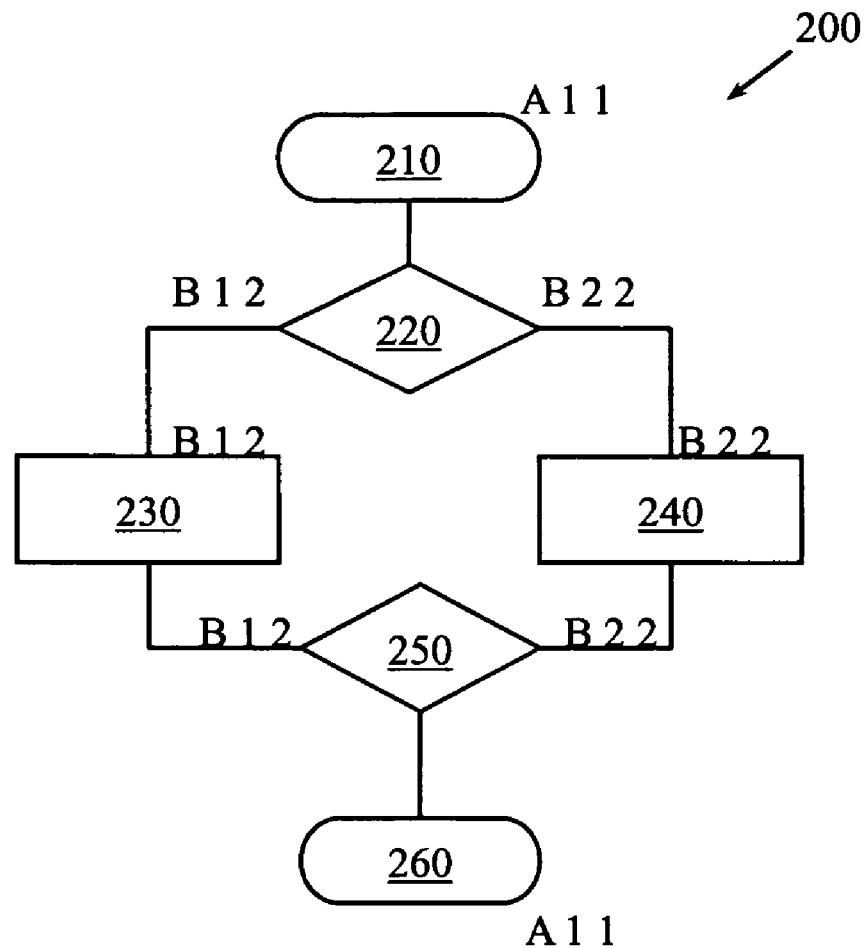
FIG. 2 illustrates an example well-structured component with a single branch that is annotated with tokens.

FIG. 2 illustrates another example well-structured component 200. Component 200 starts at starting location 210 and then branches at 220. Element 220 may be referred to as a split gateway, or just as a gateway. Gateway 220 includes two out-flowing edges. A first branch passes through process 230 while a second branch passes through process 240. The two branches merge at join gateway 250 and the process concludes at ending location 260. The component 200 is well-structured even though it has branches because the branches merge back together to a single concluding location and thus yield a one to one correspondence between splits and joins.

At split gateway 220, two different paths branch out. When a split gateway is encountered, an additional set of tokens may be generated. In this example, a second set of tokens (B) may be generated. A first member (e.g., B 1 2) of the second set of tokens (B) may be associated with a path that proceeds to process 230 before arriving at join gateway 250. A second member (e.g., B 2 2) of the second set of tokens (B) may be associated with a path that proceeds to process 240 before arriving at join gateway 250. The token notation indicates the name of the set of tokens (B), a member number (e.g., 1), and a number of members (e.g., 2). Thus, the token to the left of split gateway 220 can be read as belonging to the set of tokens B, the token being the first member of two members. These two B tokens merge at element 250. Since all the B series tokens were present at element 250, element 220 may be considered to be closed at element 250. A corresponding switch is created in BPEL which contains every element between element 220 and element 250. The B series tokens are not propagated past element 250.

Conventional systems may produce sub-optimal executables for component 200 even though component 200 is well-structured, even though there is a one to one correspondence between splits and joins, and even though token analysis processes protect the join gateway 250. For example, a conventional system may protect join gateway 250 by analyzing received incoming edges to determine whether a complete set of tokens has been received and by busy waiting until a complete set is available. However, due to different lengths of time for elements 230 and 240 to complete, due to abnormal termination of one of elements 230 and 240, and due to other causes, a complete set of incoming edges may never be received at join gateway 250. Conventional systems may handle this situation in a sub-optimal manner, if they handle it at all.

Figure 3:
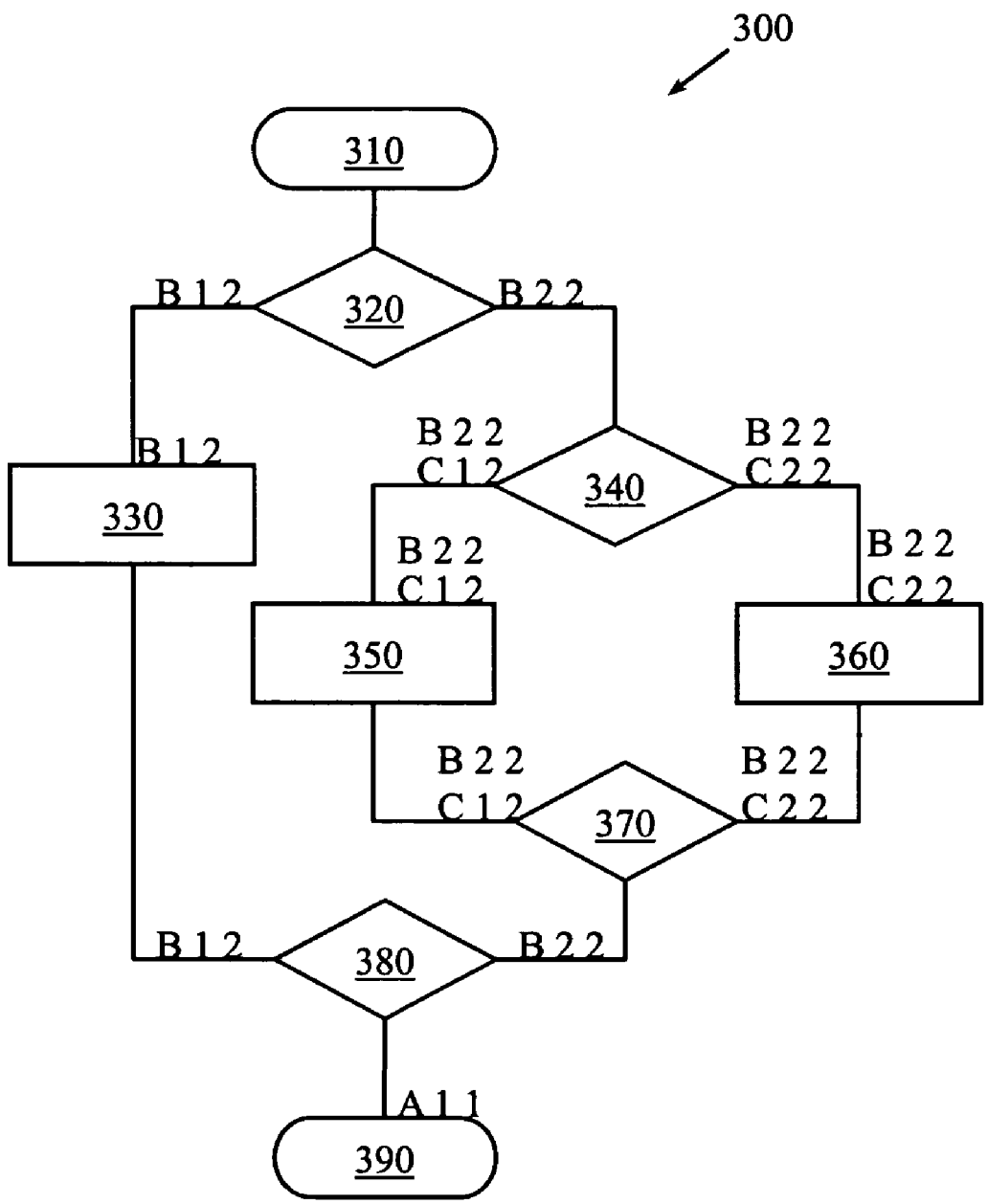
FIG. 3 illustrates an example well-structured component having multiple branches that is annotated with tokens.

FIG. 3 illustrates an example well-structured component 300. Component 300 starts at starting location 310 and concludes at ending location 390. Component 300 includes a split gateway 320, a split gateway 340, a join gateway 370, and a join gateway 380. Component 300 also includes process blocks 330, 350, and 360. Once again component 300 is a well-structured component even though it has branches because it demonstrates a one to one correspondence between splits and joins.

Component 300 is a more complicated version of the simpler use case illustrated in component 300 (FIG. 2) but is conceptually identical. Component 300 begins at start location 310 and ends at end location 390.

While components 100 (FIG. 1), 200 (FIG. 2), and 300 (FIG. 3) are all well-structured components and conventional BPMN to BPEL conversion techniques may be able to perform component analysis, there are some details that are missing in the BPMN standards document. One such detail is illustrated in FIG. 3, where the left branch after element 320 is smaller than the right branch and hence token propagation would be faster on the left branch. When element 380 is reached via the left branch, a process may have to wait for the token from the other incoming branch at element 380 and in the meantime keep processing tokens at other elements (e.g., element 340). Example systems and methods achieve this by creating a deferred gateway data structure and by pushing element 380 to that data structure to be processed later. In the meantime, processing would not progress past element 380, but may proceed on other elements (e.g., 340, 350, 360, 370). When there are no more elements left, processing would revisit the deferred gateway data structure and process 380 at this time. Processing may be allowed to proceed past the now resolved gateway.

Figure 4:
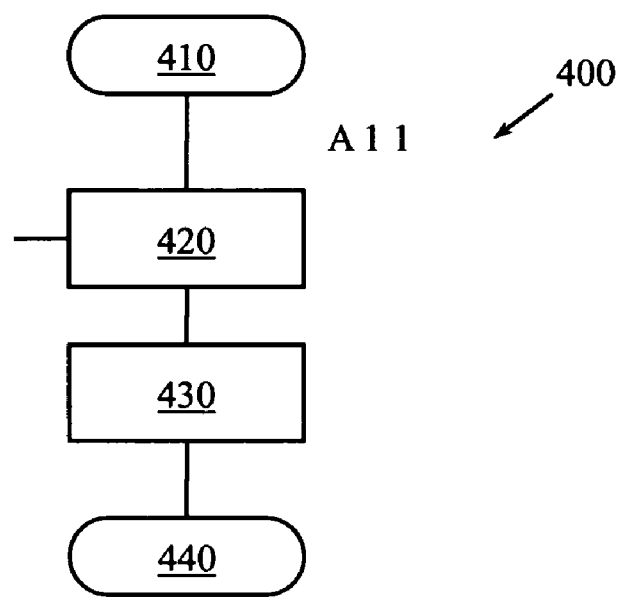
FIG. 4 illustrates a component whose conversion may have been difficult with conventional systems.

In one example, a deferred gateway resolution logic may not work. This is illustrated by FIG. 4. At element 420, a token would arrive from element 410 but not from element 450. Example systems and methods would put element 420 in a deferred gateway data structure. However, there are no other parts of a process to process. Example systems and methods may continue to try to get element 420 from the deferred gateway data structure, try to resolve it, and being unable to do so would push it back to data structure. This could cause a process to hang. To mitigate this issue, example systems and methods can be configured to only wait a pre-determined, configurable amount of time for completion of a set of incoming edges. If the wait is exceeded, then example systems and methods may provide an error message and/or signal, and terminate waiting to prevent the process from hanging.

Figure 5:
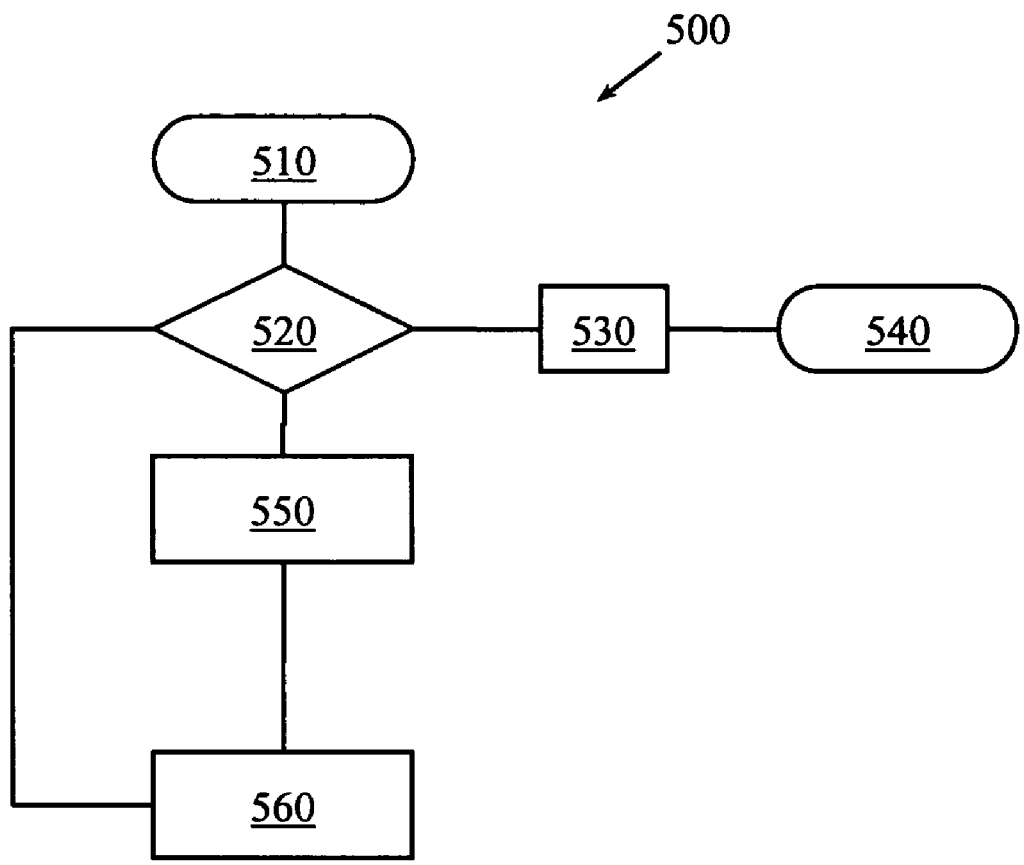
FIG. 5 illustrates a while component.

FIG. 5 illustrates a component 500 whose conversion from BPMN representation to BPEL instructions may have been difficult with conventional systems. Component 500 represents a loop in a BPMN, where there is a connection from element 560 back to element 520. The component 500 begins at starting location 510 and concludes at ending location 540. A split gateway appears at 520. Gateway 520 is programmed to receive two incoming edges, one of which is a loop back edge. It would be undesirable to have a gateway resolution logic wait to resolve gateway 520 until both incoming tokens are received because both incoming tokens may not be received until gateway 520 has been processed. Thus, gateway 520 may never receive a token on the second incoming edge, even though the logical process flow is correct and complete.

Figure 6:
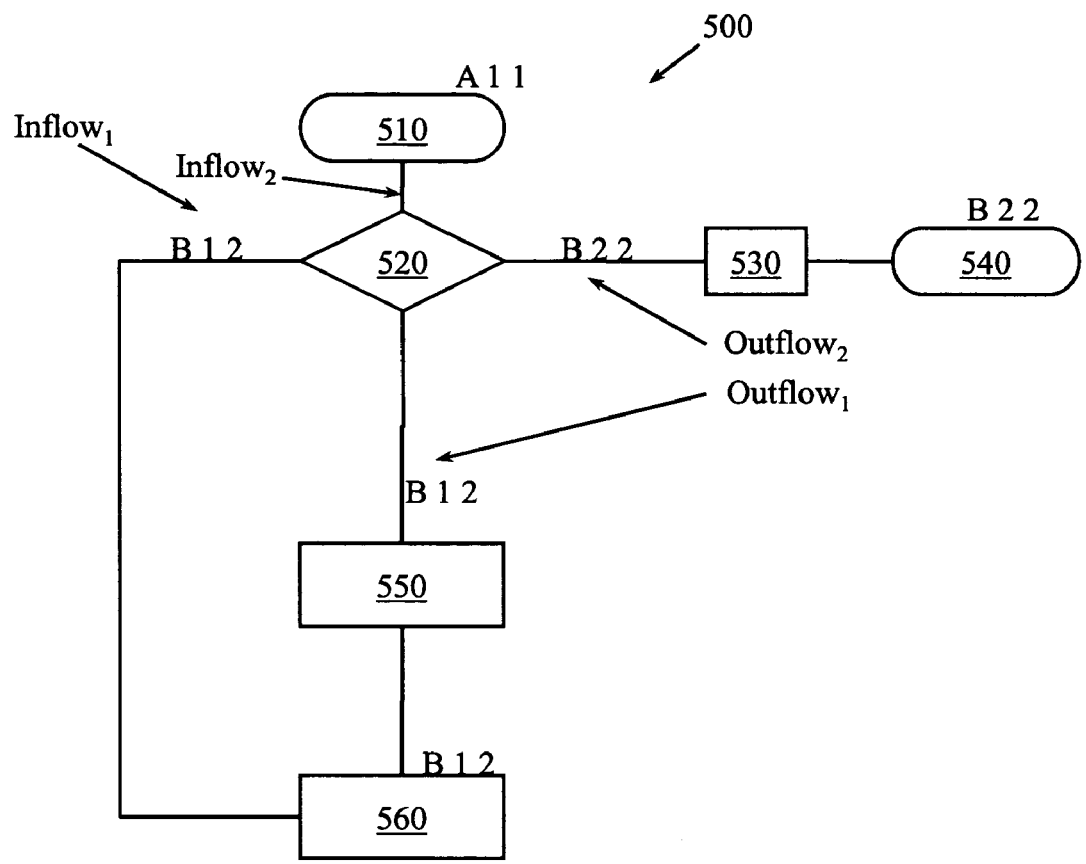
FIG. 6 illustrates a while component that is annotated with tokens. This component may be analyzed using a two pass technique claimed and described herein.

To address this type of issue, example systems and methods may perform a two pass analysis before invoking, establishing, or otherwise using a deferred resolution logic for a gateway. A first pass may identify whether a candidate gateway is programmed to receive an incoming loop back edge using standard depth first search algorithms. When the candidate gateway does not expect an incoming loop back edge, then a deferred resolution logic and deferred gateway resolution data structure may be associated with the gateway. When the candidate gateway is programmed to receive an incoming loop back edge, then a deferred resolution logic and associated data structure is only associated with the gateway taking this loopback edge as an exception. A first pass may identify gateway 520 as a candidate for deferred resolution protection. Then the second pass with deferred gateway data structure executes. When a gateway is associated with a loop back incoming edge, example systems and methods may not associate a deferred resolution logic and/or related data structure (s) with the gateway. In this example, element 520 would not be pushed to deferred gateway data structure and processed immediately and tokens published on both the outgoing branches. This is illustrated in FIG. 6. A set of tokens (e.g., (B 1 2), (B 2 2)) may be generated at split gateway 520. While token (B 1 2) may be provided back to split gateway 520 after traversing processes 550 and 560, token (B 2 2) may never be provided to split gateway 520. Thus, conventional token analyzer based systems may not produce satisfactory results for component 500.

In FIG. 6, when the token (B 1 2) comes back from element 560 to element 520 at a later time, then example systems and methods identify that (B 1 2) is the while loop and so it constructs a while structure in BPEL with elements 520, 550 and 560. The elements 530 and 540 come after the while structure.

Figure 7:
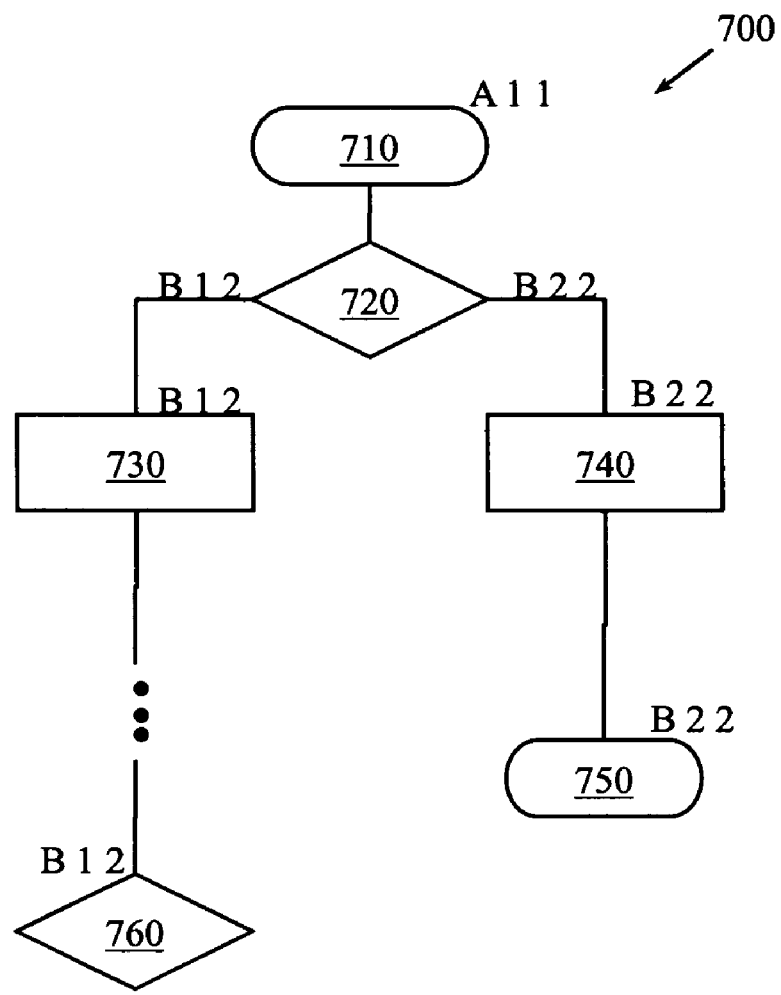
FIG. 7 illustrates a component that is not well-structured that is annotated with tokens.

FIG. 7 illustrates a component 700 that is not well-structured. Component 700 does not illustrate a one to one correspondence between splits and joins and thus is not well-structured. Component 700 begins at start location 710 and then experiences a split gateway 720. One branch proceeds through element 730 and ultimately arrives at another gateway 760. Another branch proceeds through element 740 and concludes at ending location 750. The branch that includes element 740 never merges back with the branch that includes element 730 and join gateway 760. Therefore, if a join gateway somewhere in the branch that includes element 730 was waiting for an incoming edge associated with the branch that includes element 740, then that join gateway would wait forever unless terminated. Conventional systems may have had difficulty producing useful executable BPEL for this component.

In the above example, systems and methods described and claimed herein provide an end tokens data structure and an end point logic to facilitate handling components like component 700. When an end point (e.g., conclusion 750) is reached, an end point logic would examine and/or manipulate an end tokens data structure and would put token (B 2 2) in the end token data structure. In component 700, a join gateway may be waiting for an incoming edge that will never arrive. The incoming edge may not arrive because a branch with which it is associated has terminated. Rather than have a deferred resolution logic wait indefinitely, a signal would be sent to deferred resolution logics by an end point logic. The end point logic may be invoked when an end point is reached. The end point logic may signal deferred gateway resolution logics to examine an end tokens data structure. Additionally, a deferred resolution logic may periodically examine an end tokens data structure to determine whether an incoming edge for which it is waiting has been added to the end tokens data structure. A join gateway that is waiting for token (B 2 2) may be notified that the token is never going to arrive since a path with which it was associated concluded. The deferred resolution logic may then resolve the join gateway to allow processing to continue.

Figure 8:
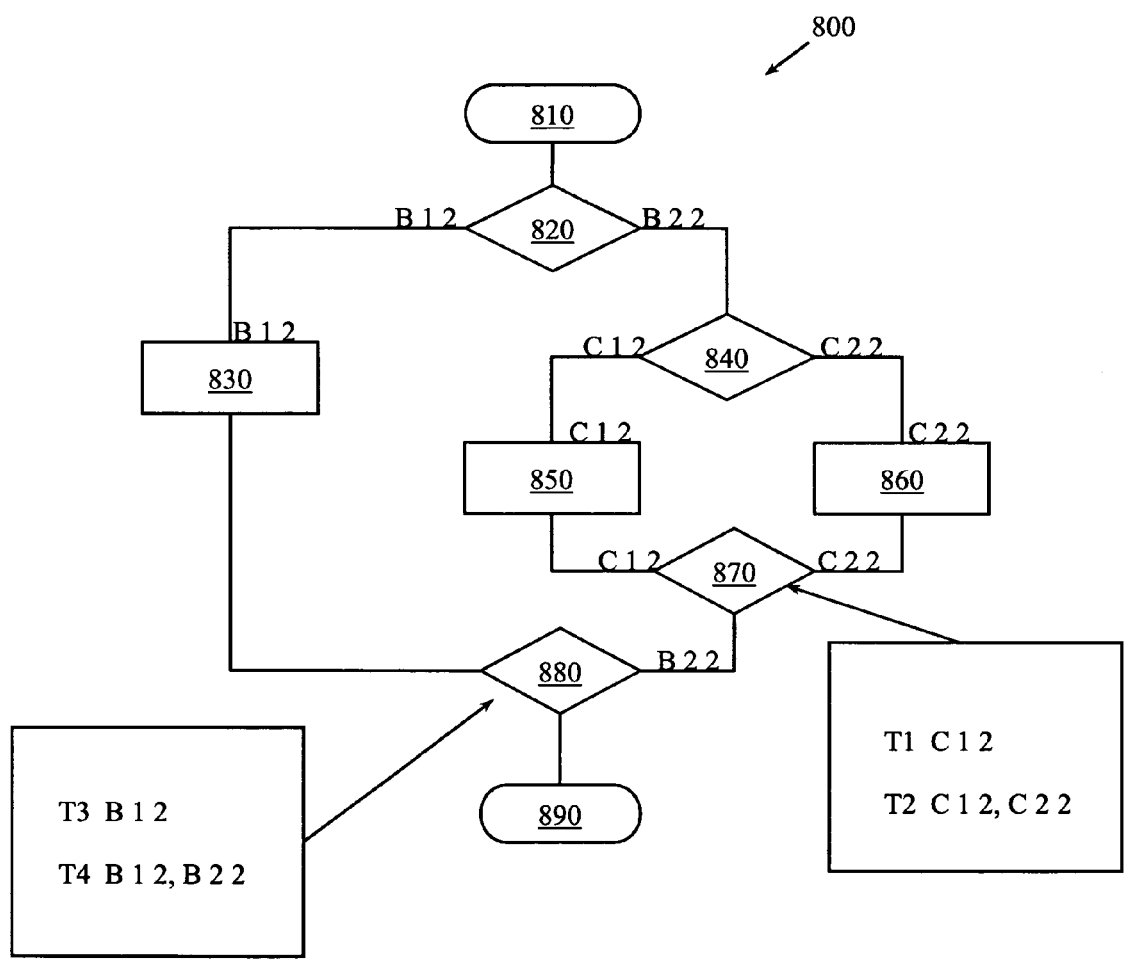
FIG. 8 illustrates a well-structured component annotated with tokens and time progression of token flow analysis.

FIG. 8 illustrates component 800 interacting with deferred gateway data structures and gateway resolution logic. In one example, a deferred gateway resolution data structure may be allocated and created ahead of time. Then, the data structure may be updated (e.g., written to) upon detecting a join gateway. FIG. 8 illustrates two different states for 870 that are associated with two different points in time. At a first time T1, 870 may receive token (C 1 2) but may not have received any other tokens. The gateway resolution logic may examine a set of tokens to determine whether a complete set of tokens has been received and thus whether a gateway can be resolved. If the set is complete, the gateway resolution logic may provide a signal that allows processing of component 800 to proceed beyond join gateway 870. If the set is incomplete, the gateway resolution logic may check to see whether join gateway 870 has experienced an unacceptable delay. For example, the gateway resolution logic may determine whether a waiting interval has elapsed, whether an abnormal termination signal has been received, and so on.

At a second, later time T2, 870 may receive token (C 2 2). At this point a gateway resolution logic may determine that both parts of token C have been received and that join gateway 870 can be resolved. The gateway resolution logic may, for example, provide a signal to allow the providing of token (B 2 2) to join gateway 880. At a time T3, a first token (B 1 2) may have been received. At a time T4, a second token (B 2 2) may be received and the gateway resolution logic may resolve join gateway 880 upon determining that the complete set of B tokens has been received.

Figure 9:
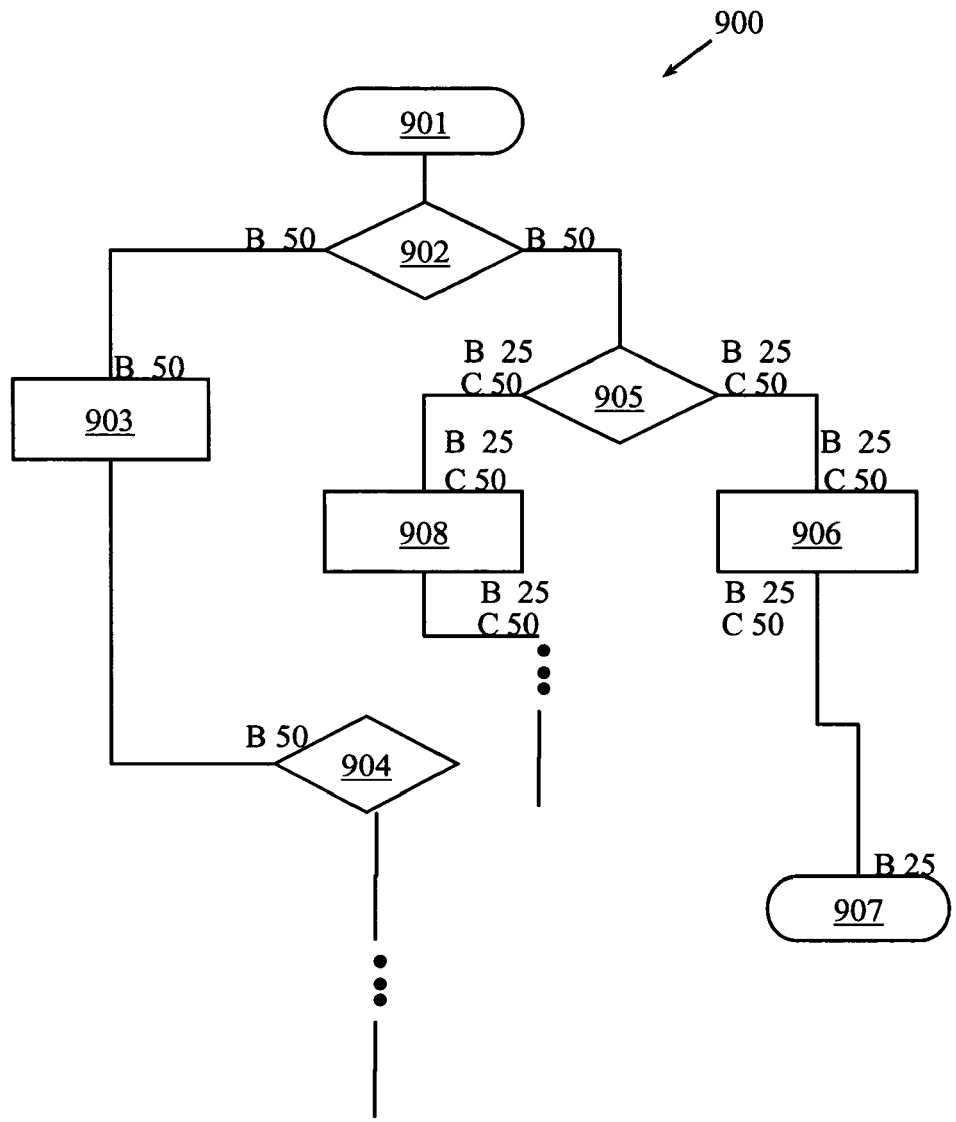
FIG. 9 illustrates a component interacting with a fractional tokens data structure, the component is not well-structured and is annotated with tokens.

FIG. 9 illustrates component 900. Example systems and methods modify a token data structure from (B 1 2) to (B 50). The notation (B 50) indicates that a token represents fifty percent of a complete token. The fractional data structures record information about fractions of tokens received. At split gateway 902, token B is divided into two halves. This is used to solve the following issue. If (B 1 2) and (B 2 2) are created at 902, then (B 2 2) would have reached 907 and would have been recorded as part of end token data structure. This would have triggered processing of 904, which would have inferred that 904 can be resolved and 904 is the join gateway for 902. This may have been wrong if the branch coming out of 908 would have later joined the branch coming out of 904. By using fractions, only 75 percent is available at 904, not 100 percent. If the branch from 908 later ends in a terminate event, then this can later be recorded in the end token data structure as having (B 50) and that 904 is the end for 902. Alternatively, if the branch from 908 merges later with the branch from 904, then 902 can close at that later gateway rather than 904. This gives accurate results in both cases. As each portion is received, a gateway resolution logic may determine whether a gateway can be resolved based on the overall received percentage.

Figure 10:
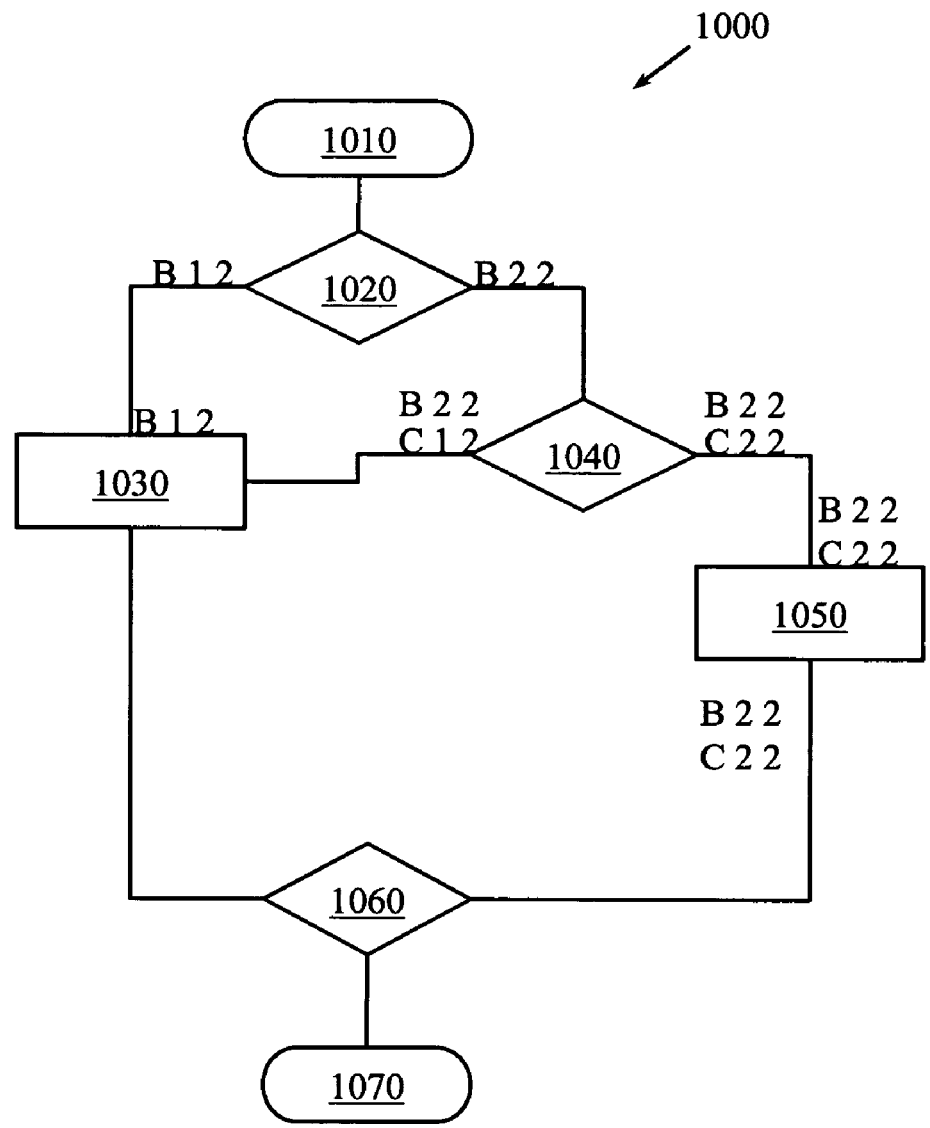
FIG. 10 illustrates a component that may not be capable of being resolved.

FIG. 10 illustrates component 1000. This component is not well balanced and there is an edge from 1040 to 1030. FIG. 10 also shows tokens on edges. While processing 1030, example systems and methods have tokens on all edges and thus a gateway resolution logic can be used to close the B token at 1030. But that is not appropriate as there is an inner gateway 1040 that is still open and 1020 should not be closed before 1040. This is determined by checking the highest series on the two incoming edges to 1030. This is the C series and it can not be resolved at 1030, since not all the C tokens have been received at 1030. Example systems and methods would terminate and show an error concerning the inability to process 1030.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 11:
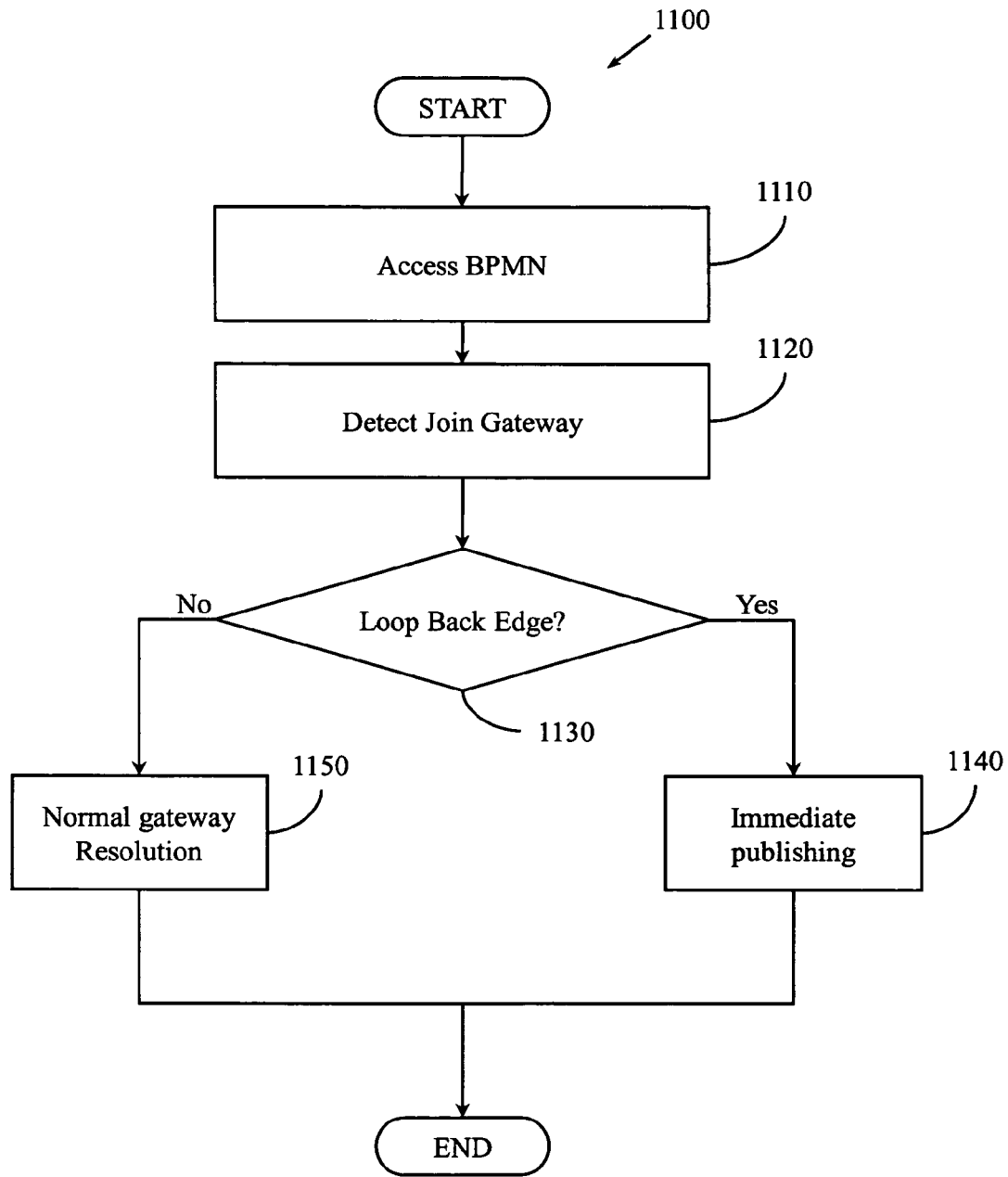
FIG. 11 illustrates an example method associated with BPD component analysis.

FIG. 11 illustrates a method 1100 associated with BPD component analysis. Method 1100 may include, at 1110, accessing a business process diagram (BPD). The BPD may have BPD components for which mappings to business process execution language (BPEL) components are to be automatically produced by a computer. The components may include, for example, splits, joins, start locations, end locations, and combinations thereof. The BPD may be specified in a business process mapping notation (BPMN).

Method 1100 may include, at 1120, detecting a join gateway in the BPD. Detecting a join gateway provides a first piece of information. Method 1100 also includes, at 1130, determining whether the join gateway is to receive a loop back edge. Detecting the loop back edge provides a second piece of information. Therefore, method 1100 may be performed as a computer-implemented method that includes actions 1120 and 1130 in a two pass BPD analysis where a first pass identifies candidate gateways and a second pass identifies loop back edges and gateways associated therewith.

Having determined that a join gateway in a BPD is to receive a loop back edge, method 1100 may continue, at 1140, by manipulating the mapping to identify that resolution of the join gateway is not to be determined by normal gateway resolution. This may be referred to as performing immediate resolution. Recall from the discussion above that gateways may receive incoming edges at different times and that example systems and methods may therefore allow for deferred resolution. However, a join gateway associated with a loop back edge may not be configured by method 1100 to be associated with deferred gateway resolution.

Having determined that a join gateway in a BPD is not to receive a loop back edge, method 1100 may continue, at 1150, by manipulating the mapping to identify that resolution of the join gateway is to be determined by deferred gateway resolution.

In one example, a method may be implemented as computer executable instructions. Thus, in one example, a computer-readable medium may store computer executable instructions that if executed by a machine (e.g., processor) cause the machine to perform method 1400. While executable instructions associated with method 1400 are described as being stored on a computer-readable medium, it is to be appreciated that executable instructions associated with other example methods described herein may also be stored on a computer-readable medium.

Figure 12:
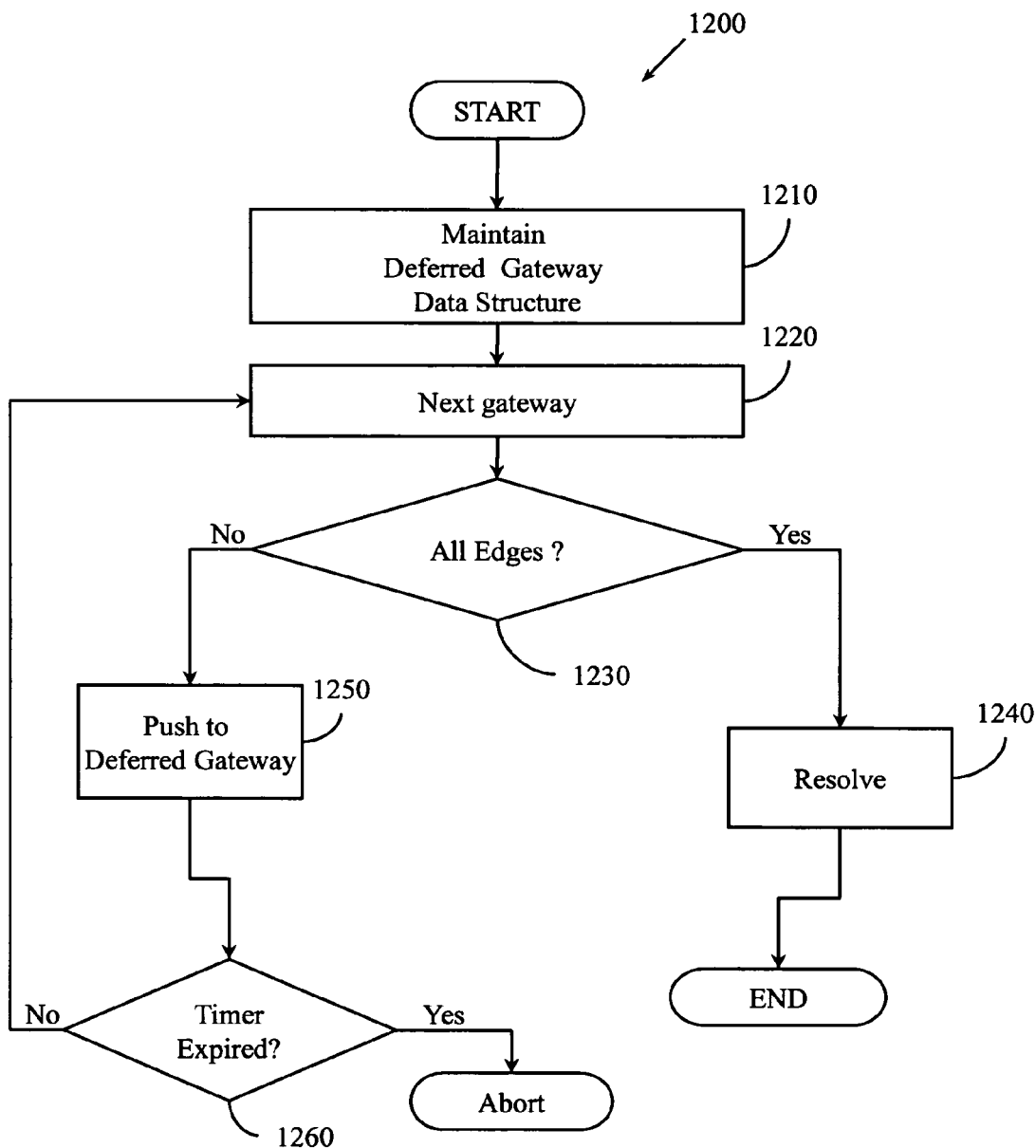
FIG. 12 illustrates another example method associated with BPD component analysis.

FIG. 12 illustrates a method 1200 associated with performing deferred gateway resolution. Resolving a gateway refers to determining that execution of a model in which the gateway appears may proceed past the gateway because an acceptable set of branches performed above the gateway have concluded. In one example, method 1200 includes, at 1210, maintaining a deferred gateway data structure associated with the join gateway.

Method 1200 may also include, at 1220, processing a join gateway. Method 1200 may also include, at 1230, detecting an incoming edge. The detecting may include receiving information about a token associated with the incoming edge.

With incoming edge information available, method 1200 may proceed at 1230 by determining whether a complete set of incoming edges has been received. Determining that a complete set of incoming edges has been received may include identifying whether all members of a set of tokens have been received, identifying a percentage of a token that has been received, and so on.

Since method 1200 includes determining at 1230 whether there is a complete set of received edges, method 1200 may take different actions depending on whether that complete set is present. When the complete set is not available, method 1200 may proceed, at 1250, by selectively updating the deferred gateway data structure. When the complete set is available, method 1200 may proceed, at 1240, by resolving the gateway.

If the complete set is not available, method 1200 may take an action to prevent the indefinite. Thus, method 1200 may include, at 1260, determining whether a timer has expired. The timer may have been started when a first incoming edge was received at the join gateway, when the process first began, when a split gateway associated with the join gateway was executed, and so on. If the timer has expired, then method 1200 may abort. If the timer has not expired, then method 1200 may return to 1220 to detect a next gateway.

Figure 13:
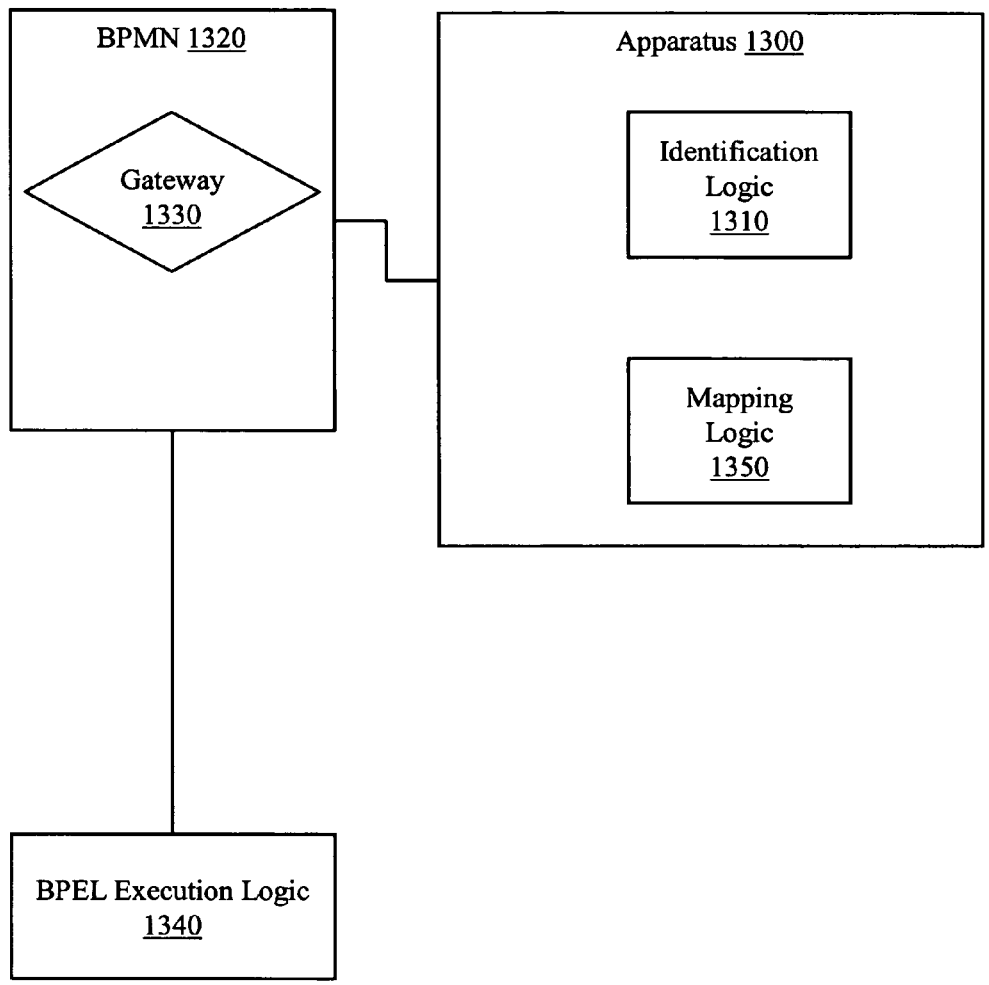
FIG. 13 illustrates an example system associated with BPD component analysis.

FIG. 13 illustrates an apparatus 1300 associated with BPMN component analysis and with generating workable, correct BPEL instructions for a BPMN construct. Thus, apparatus 1300 may include an identification logic 1310. Identification logic 1310 may identify a join gateway 1330 in a BPMN 1320. Apparatus 1300 may interact with a logic that is to generate a set of BPEL statements for the join gateway.

Apparatus 1300 includes a mapping logic 1350 which can be used to generate BPEL code corresponding to BPMN construct. Mapping logic 1350 may control a BPEL execution logic 1340 based on the gateway identification. In one example, the mapping logic 1350 may control the BPEL execution logic 1340 to selectively generate a switch or flow.

Figure 14:
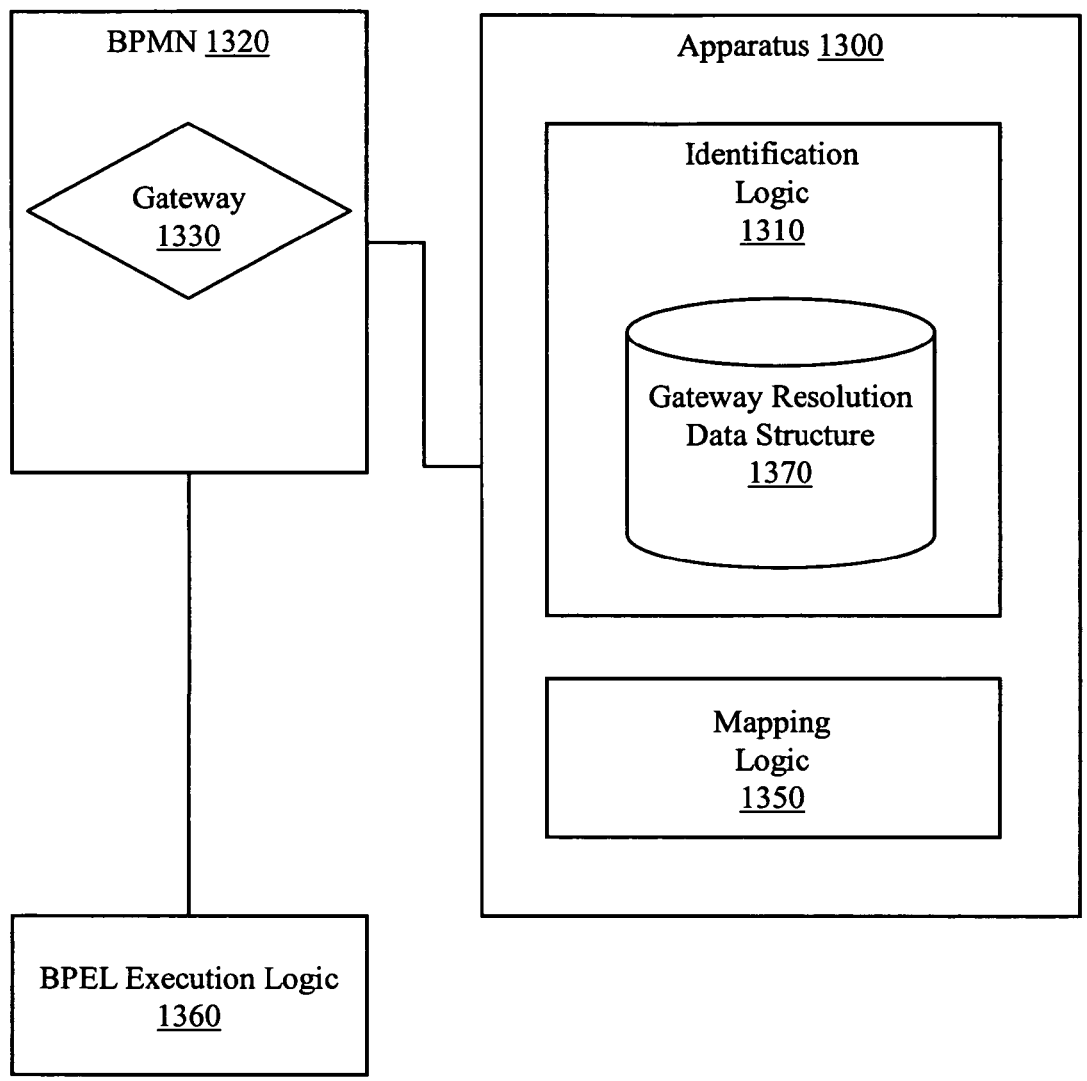
FIG. 14 illustrates another example system associated with BPD component analysis.

Turning now to FIG. 14, a different embodiment of apparatus 1300 is illustrated. In this example, the identification logic 1310 includes a gateway resolution data structure 1370. Manipulating the gateway resolution data structure 1370 may include reading and/or writing values to and/or from the data structure 1370, and so on. The gateway resolution data structure 1370 may store information upon which a gateway resolution decision can be made. The information may include, for example, tokens, fractional tokens, edge set data, and so on.

It may be desired to define a finite amount of time for a gateway to be resolved to prevent indefinite waiting. Thus, in one example, apparatus 1300 may selectively abort deferred gateway resolution based, at least in part, on a timer. The wait timer may have been established when apparatus encountered a gateway for which deferred resolution is unable to resolve the gateway and/or at other times.

Figure 15:
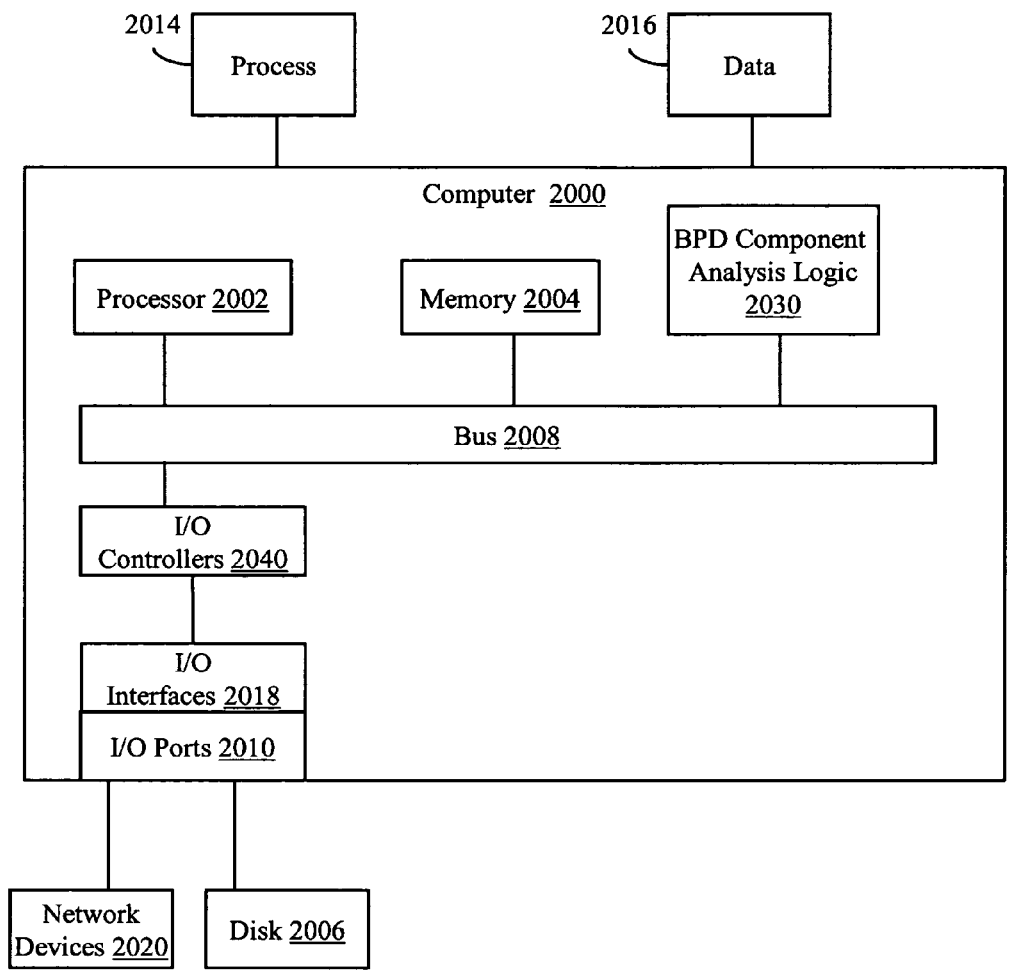
FIG. 15 illustrates an example computing environment in which example systems, methods, and equivalents, may operate.
Figure 4:
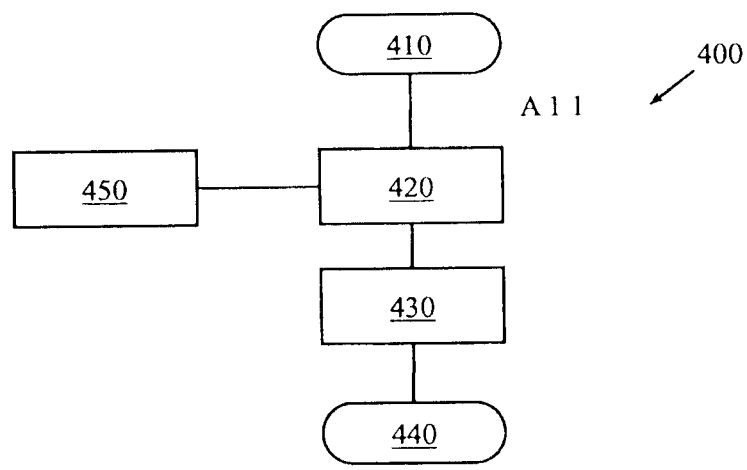

FIG. 15 illustrates an example computing device in which example systems and methods described herein, and equivalents, may operate. The example computing device may be a computer 2000 that includes a processor 2002, a memory 2004, and input/output ports 2010 operably connected by a bus 2008. In one example, the computer 2000 may include a BPD component analysis logic 2030 configured to facilitate producing workable correct BPEL from BPD components. In different examples, the logic 2030 may be implemented in hardware, software, firmware, and/or combinations thereof. While the logic 2030 is illustrated as a hardware component attached to the bus 2008, it is to be appreciated that in one example the logic 2030 could be implemented in the processor 2002.

Logic 2030 may provide means (e.g., hardware, software, firmware) for identifying a gateway in a BPD for which a set of BPEL instructions are to be included in a BPD to BPEL mapping. In one example, the means may include a two pass analyzer to first detect candidate gateways and then to identify gateways associated with loop back edges. Logic 2030 may also provide means for controlling BPEL execution of the set of BPEL instructions to selectively perform deferred gateway resolution for the gateway. Deferred gateway resolution may depend, for example, on manipulating a gateway resolution data structure, an end tokens data structure, and so on. Either or both data structures may store fractional tokens. The means may be implemented, for example, as an ASIC programmed to analyze a BPD component and to control a BPEL execution logic. The means may also be implemented as computer executable instructions that are presented to computer 2000 as data 2016 that are temporarily stored in memory 2004 and then executed by processor 2002.

Generally describing an example configuration of the computer 2000, the processor 2002 may be a variety of various processors including dual microprocessor and other multiprocessor architectures. A memory 2004 may include volatile memory and/or non-volatile memory. Non-volatile memory may include, for example, ROM, PROM, and so on. Volatile memory may include, for example, RAM, SRAM, DRAM, and so on.

A disk 2006 may be operably connected to the computer 2000 via, for example, an input/output interface (e.g., card, device) 2018 and an input/output port 2010. The disk 2006 may be, for example, a magnetic disk drive, a solid state disk drive, a floppy disk drive, a tape drive, a Zip drive, a flash memory card, a memory stick, and so on. Furthermore, the disk 2006 may be a CD-ROM drive, a CD-R drive, a CD-RW drive, a DVD ROM, and so on. The memory 2004 can store a process 2014 and/or a data 2016, for example. The disk 2006 and/or the memory 2004 can store an operating system that controls and allocates resources of the computer 2000.

The bus 2008 may be a single internal bus interconnect architecture and/or other bus or mesh architectures. While a single bus is illustrated, it is to be appreciated that the computer 2000 may communicate with various devices, logics, and peripherals using other busses (e.g., PCIE, 1394, USB, Ethernet). The bus 2008 can be types including, for example, a memory bus, a memory controller, a peripheral bus, an external bus, a crossbar switch, and/or a local bus.

The computer 2000 may interact with input/output devices via the i/o interfaces 2018 and the input/output ports 2010. Input/output devices may be, for example, a keyboard, a microphone, a pointing and selection device, cameras, video cards, displays, the disk 2006, the network devices 2020, and so on. The input/output ports 2010 may include, for example, serial ports, parallel ports, and USB ports.

The computer 2000 can operate in a network environment and thus may be connected to the network devices 2020 via the i/o interfaces 2018, and/or the i/o ports 2010. Through the network devices 2020, the computer 2000 may interact with a network. Through the network, the computer 2000 may be logically connected to remote computers. Networks with which the computer 2000 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer, which includes at least a processor, cause the computer to perform a method, the method comprising:

accessing, using at least the processor, a business process diagram (BPD) having a business process modeling notation (BPMN) component for which a mapping to a business process execution language (BPEL) component is to be automatically produced by the computer;

detecting, using at least the processor, a join gateway in the business process modeling notation; and upon determining, using at least the processor, that the join gateway is to receive a loop back edge, manipulating the mapping to identify that resolution of the join gateway is not to be determined by deferred gateway resolution and publishing tokens on outgoing edges in the mapping.

2. The non-transitory computer-readable medium of claim 1, where the method includes, upon determining that the join gateway is not to receive a loop back edge, manipulating the mapping to identify that resolution of the join gateway is to be determined by a gateway resolution logic.

3. The non-transitory computer-readable medium of claim 1, where the mapping produces a set of executable statements, where the business process diagram is specified in a business process modeling notation.

4. The non-transitory computer-readable medium of claim 1, where the business process execution language is a web service-based XML execution language.

5. The non-transitory computer-readable medium of claim 1, further including maintaining a deferred gateway resolution data structure in a memory device.

6. The non-transitory computer-readable medium of claim 5, where the deferred gateway resolution data structure stores information identifying gateways that can not be processed immediately.

7. The non-transitory computer-readable medium of claim 1 wherein resolution of the join gateway includes detecting completion of incoming tokens associated with the join gateway and selectively updating a deferred gateway data structure.

8. The non-transitory computer-readable medium of claim 7 wherein resolution of the join gateway includes selectively aborting the gateway resolution upon determining that a total configurable wait time has been exceeded.

9. The non-transitory computer-readable medium of claim 7 wherein resolution of the join gateway includes selectively resolving the join gateway based, at least in part, on detecting a termination of a branch in the BPEL component.

10. The non-transitory computer-readable medium of claim 1 wherein the method further comprises detecting normal termination of a branch in the BPEL component by receiving a signal from an end point logic and where resolving the join gateway is based, at least in part, on one or more of, the signal, and information stored in an end tokens data structure that is manipulated by the end point logic.

11. The non-transitory computer-readable medium of claim 10, where the end tokens data structure is a fractional end tokens data structure and all tokens are fractional tokens.

12. The non-transitory computer-readable medium of claim 1, the method further including selectively providing an error message upon determining that a BPMN component can not be resolved because an inner gateway has not resolved.

13. An apparatus, comprising:
at least a processor;
an identification logic configured to use the processor to identify a join gateway in a business process modeling notation, where a set of business process execution language statements are to be automatically produced for the join gateway, where the identification logic performs at least two passes through the business process modeling notation, and where the identification logic determines whether the join gateway is to receive a loop back edge; and
a mapping logic configured to use the processor to selectively manipulate the mapping associated with the join gateway to perform immediate gateway resolution for the join gateway in response to determining that the join gateway is to receive a loop back edge and to publish tokens on outgoing edges and to perform deferred gateway resolution for the join gateway in response to determining that the join gateway is not to receive a loop back edge.

14. The apparatus of claim 13, where the mapping logic is configured to use the processor to control the deferred gateway resolution by manipulating a gateway resolution data structure that stores information upon which a gateway resolution decision is to be made.

15. The apparatus of claim 13, where the mapping logic is configured to use the processor to control the deferred gateway resolution for the join gateway by selectively aborting the deferred gateway resolution based, at least in part, on a gateway wait timer.

16. The apparatus of claim 13, where the mapping logic is configured to use the processor to control the deferred gateway resolution for the join gateway by providing an end point signal when an end point is encountered.

17. The apparatus of claim 13, where the mapping logic is configured to use the processor to control the deferred gateway resolution for the join gateway by selectively manipulating an end tokens data structure when an end point is encountered during BPEL execution.

18. The apparatus of claim 17, where the end tokens data structure is configured to store fractional tokens.

19. A system comprising:
means for identifying a gateway in a business process modeling notation (BPMN) for which a set of business process execution language (BPEL) instructions are to be included in a BPMN to BPEL mapping;
means for determining that the gateway is to receive a loop back edge and in response thereto, manipulating the BPMN to BPEL mapping to identify that resolution of the gateway is not to be determined by deferred gateway resolution and to publish tokens on outgoing edges in the BPMN; and
means for generating BPEL instructions to selectively perform deferred gateway resolution for the gateway if the gateway is not to receive a loop back edge, wherein the deferred gateway resolution depends on manipulating one or more of, a gateway resolution data structure, and an end tokens data structure.

* * * * *

UNITED STATES PATENT AND TRADEMARK OFFICE
CERTIFICATE OF CORRECTION

PATENT NO. : 8,352,909 B2
APPLICATION NO. : 12/287323
DATED : January 8, 2013
INVENTOR(S) : Aggarwal et al.

It is certified that error appears in the above-identified patent and that said Letters Patent is hereby corrected as shown below:

In the Drawings:

Delete drawing sheet 4 of 15 and insert drawing sheet 4 of 15 consisting of figure 4 as attached.

In the Specifications:

In column 2, line 61, delete "and or" and insert -- and/or --, therefor.

Signed and Sealed this
Seventh Day of May, 2013

Teresa Stanek Rea
*Acting Director of the United States Patent and Trademark Office*